(12) United States Patent
Haidar et al.

(10) Patent No.: US 11,423,282 B2
(45) Date of Patent: Aug. 23, 2022

(54) AUTOENCODER-BASED GENERATIVE ADVERSARIAL NETWORKS FOR TEXT GENERATION

(71) Applicant: Huawei Technologies Co., Ltd., Shenzhen (CN)

(72) Inventors: Md Akmal Haidar, Montreal (CA); Mehdi Rezagholizadeh, Montreal (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 968 days.

(21) Appl. No.: 16/175,280

(22) Filed: Oct. 30, 2018

(65) Prior Publication Data

US 2020/0134415 A1 Apr. 30, 2020

(51) Int. Cl.
*G06N 3/02* (2006.01)
*G06N 7/00* (2006.01)

(52) U.S. Cl.
CPC ............... *G06N 3/02* (2013.01); *G06N 7/005* (2013.01)

(58) Field of Classification Search
CPC ........ G06N 3/02; G06N 7/005; G06N 3/0472; G06N 3/088; G06N 3/0454
See application file for complete search history.

(56) References Cited

U.S. PATENT DOCUMENTS

| | | | |
|---|---|---|---|
| 11,106,903 B1 * | 8/2021 | Huynh | G06K 9/00369 |
| 2018/0082150 A1 | 3/2018 | Itou et al. | |
| 2018/0176578 A1 * | 6/2018 | Rippel | G06N 3/08 |
| 2018/0314716 A1 * | 11/2018 | Kim | G06T 1/0007 |
| 2019/0130221 A1 * | 5/2019 | Bose | G06K 9/6257 |
| 2019/0236148 A1 * | 8/2019 | DeFelice | G06F 40/216 |
| 2020/0034432 A1 * | 1/2020 | Jain | G06N 3/0454 |

FOREIGN PATENT DOCUMENTS

CN 107832353 A 3/2018

OTHER PUBLICATIONS

Unregularized Auto-Encoder with Generative Adversarial Networks for Image Generation Wang et al. (Year: 2018).*
Adversarial Feature Matching for Text Generation Zhang et al. (Year: 2017).*

(Continued)

*Primary Examiner* — Eric Nilsson
*Assistant Examiner* — Ababacar Seck
(74) *Attorney, Agent, or Firm* — Slater Matsil, LLP

(57) ABSTRACT

In accordance to embodiments, an encoder neural network is configured to receive a one-hot representation of a real text and output a latent representation of the real text generated from the one-hot representation of the real text. A decoder neural network is configured to receive the latent representation of the real text, and output a reconstructed softmax representation of the real text from the latent representation of the real text, the reconstructed softmax representation of the real text is a soft-text. A generator neural network is configured to generate artificial text based on random noise data. A discriminator neural network is configured to receive the soft-text and receive a softmax representation of the artificial text, and output a probability indicating whether the softmax representation of the artificial text received by the discriminator neural network is not from the generator neural network.

27 Claims, 3 Drawing Sheets

(56) References Cited

OTHER PUBLICATIONS

Text Encoding for Deep Learning Neural Networks: A Reversible Base 64 (Tetrasexagesimal) Integer Transformation (RIT64) Alternative to One Hot Encoding with Applications to Arabic Morphology ELAffendi et al. (Year: 2018).*
Generative Image Modeling using Style and Structure Adversarial Networks Wang et al. (Year: 2016).*
Adversarially Regularized Autoencoders Zhao et al. (Year: 2018).*
Generative Adversarial Networks with Decoder-Encoder Output Noise Zhong et al. (Year: 2018).*
Deep Clustering via Joint Convolutional Autoencoder Embedding and Relative Entropy Minimization Dizaji et al. (Year: 2017).*
Adversarial Autoencoders Makhzani et al. (Year: 2016).*
Learning Representations of Natural Language Texts with Generative Adversarial Networks at Document, Sentence, and Aspect Level Vlachostergiou et al. (Year: 2018).*
Haidar, MD., A., et al., "Latent Code and Text-based Generative Adversarial Networks for Soft-text Generation", Proceedings of NAACL-HLT 2019, Jun. 2-7, 2019, 11 Pages, Minneapolis, Minnesota.
Bahdanau., D., et al., "Neural Machine Translation by Jointly Learning to Align and Translate", arXiv Preprint arXiv:1409.0473 [cs.CL], V.7, May 19, 2016, 15 Pages.
Bengio, Y., et al., "Curriculum Learning", Proceedings of the 26th Annual International Conference on Machine Learning, Jun. 2009, 8 Pages.
Bowman, S., et al., "Generating Sentences from a Continuous Space", arXiv Preprint, arXiv: 1511.06349 [cs.LG], V.1, May 12, 2016, 12 Pages.
Che, T., et al., "Maximum-Likelihood Augmented Discrete Generative Adversarial Networks", arXiv Preprint arXiv:1702.07983 [cs.AI], V.1, Feb. 26, 2017, 11 Pages.
Cifka, O., et al., "Eval All, Trust a Few, Do Wrong to None: Comparing Sentence Generation Models", arXiv Preprint arXiv:1804.07972 [cs.CL], V.2 Oct. 30, 2018, 12 Pages.
Dumoulin, V., et al., "Adversarially Learned Inference", arXiv Preprint arXiv: 1606.00704 [stat.ML], V.3, Feb. 21, 2017, 18 Pages.
Fedus, W., et al., "MaskGan: Better Text Generation via Filing in the .", arXiv Preprint arXIV: 1801.07736 [stat.ML]., V.3, Mar. 1, 2018, 17 Pages.
Goodfellow, I., et al., "Generative Adversarial Nets", Neural Information Processing Systems, 2014, 9 Pages. Montreal, QC.
Gulrajani, I., et al., "Improved Training of Wasserstein GANs", arXiv Preprint, arXiv:1704.00028 [cs.LG], V.3, Dec. 25, 2017, 20 Pages.
Guo, J., et al., "Long Text Generation via Adversarial Training with Leaked Information", arXiv Preprint arXiv: 1709 08624 [cs. CL]., V 2, Dec. 8, 2017, 14 Pages.
Hochreiter., S., et al., "Long Short-Term Memory", Neural Computation, 9 (8): 1735-1780, Dec. 1997, 32 Pages.
Hu, Z., et al., "Toward Controlled Generation of Text", arXiv Preprint arXiv: 1703.00955 [cs. LG],V.4, Sep. 13, 2018, 10 Pages.
Huszar, F., et al., "How (Not) to Train Your Generative Model: Scheduled Sampling, Likelihood, Adversary?", arXiv Preprint arXiv: 1511.05101 [stat.ML], V.1 Nov. 16, 2015, 9 Pages.
Kingma, D., et al., "Auto-Encoding Variational Bayes", arXvi Preprint arXvi:1312.6114 [stat.ML], V.10, May 1, 2014, 14 Pages.
Kusner, M., et al., "GANS for Sequences of Discrete Elements with the Gumbel-softmax Distribution", arXiv Preprint arXiv: 1611.04051 [stat.ML], V.1, Nov. 12. 2016, 6 Pages.
Li, J., et al., "Adversarial Learning for Neural Dialogue Generation", arXvi Preprint arXvi:1701.06547 [cs.CL], V.5, Sep. 24, 2017, 13 Pages.
Lin, K., et al., "Adversarial Ranking for Language Generation", arXiv Preprint arXiv: 1705.11001 [cs.CL], V.3, Apr. 16, 2018, 11 Pages.
Makhzani, A., et al., "Adversarial Autoencoders", arXiv Preprint arXiv:1511.05644 [cs.LG], V.2, May 25, 2016, 16 Pages.
Mikolov, T., et al., "Recurrent Neural Network Based Language Model", Interspeech 2010, Sep. 2010, 4 Pages, Makuhari, Chiba, Japan.
Press., O., et al., "Language Generation with Recurrent Generative Adversarial Networks without Pre-Training", arXiv Preprint arXiv: 1706.01399 [cs.CL], V.3, Dec. 21, 2017, 5 Pages.
Rajeswar, S., et al., "Adversarial Generation of Natural Language", arXiv Preprint arXiv:1705.10929 [cs.CL], V.1, May 31, 2017, 11 Pages.
Salimans, T., et al., "Improved Techniques for Training GANs", arXiv Preprint arXiv:1606.03498 [cs.LG], V.1, Jun. 10, 2016, 10 Pages.
Spinks, G., et al., "Generating Continuous Representations of Medical Texts", Proceedings of NAACL-HLT 2018 Demonstrations, Jun. 2018, pp. 66-70, New Orleans, Louisiana.
Wang, J., et al., IRGAN: A Minimax Game for Unifying Generative and Discriminative Information Retrieval Models, arXiv Preprint arXiv:1705.10513 [cs.IR], V.2, Feb. 22, 2018, 12 Pages.
Williams, R., et al., "A Learning Algorithm for Continually Running Fully Recurrent Neural Networks", Neural Computation, vol. 1, Issue 2, Jun. 1989, 10 Pages.
Wu., L., et al., "Adversarial Neural Machine Translation", arXiv Preprint arXiv:1704.06933 [cs.CL], V.4, Sep. 30, 2018, 11 Pages.
Xu., K., et al., "Show, Attend and Tell: Neural Image Caption Generation with Visual Attention", arXiv Preprint arXiv:1502.03044 [cs.LG], V.3, Apr. 19, 2016, 22 Pages.
Yang, Z., et al., "Improving Neural Machine Translation with Conditional Sequence Generative Adversarial Nets", arXiv Preprint arXiv:1703.04887 [cs.CL], V.4., Apr. 8, 2018, 10 Pages.
Yang, Z., et al., Semi-Supervised QA with Generative Domain-Adaptive Nets., arXiv Preprint arXiv:1702.02206 [cs.CL], V.2, Apr. 22, 2017, 11 Pages.
Yu, L., et al., "SeqGAN: Sequence Generative Adversarial Nets with Policy Gradient", Association for the Advancement of Artificial Intelligence, Aug. 2017, 11 Pages.
Zhang, Y., et al., "Adversarial Feature Matching for Text Generation", arXiv Preprint, arXiv:1706.03850 [stat.ML], V.3, Nov. 18, 2017, 10 Pages.
Zhao, J., et al., "Adversarially Regularized Autoencoders", arXvi Preprint arXvi:1706.04223 [cs.LG], V.1 Jun. 29, 2018, 16 Pages.
Zhu, Y., et al., "Texygen: A Benchmarking Platform for Text Geneation Models", arXiv Preprint arXiv: 1802.01886 [cs.CL], V. 1, Feb. 6, 2018, 4 Pages.
Elaffendi, M., et al., "Text Encoding for Deep Learning Neural Networks: A Reversible Base 64 (Tetrasexagesimal) Integer Transformation (RIT64) Alternative to One Hot Encoding with Applications to Arabic Morphology", 2018 Sixth International Conference on Digital Information, Networking, and Wireless Communications (DINWC), May 10, 2018, 5 Pages.
Wang, X., et al., "Generative Image Modeling using Style and Structure Adversarial Networks", arXiv: 1603.05631 v2 [cs.CV] Jul. 26, 2016, 22 Pages.
Wang, J., et al., "Unregularized Auto-Encoder with Generative Adversarial Networks for Image Generation", Session: FF-3, MM'18, Oct. 22-26, 2018, 9 Pages, Seoul, Republic of Korea.

* cited by examiner

AUTOENCODER-BASED GENERATIVE ADVERSARIAL NETWORKS FOR TEXT GENERATION

TECHNICAL FIELD

The present disclosure relates generally to generative adversarial networks (GANs) and, in particular, to methods and systems for autoencoder-based GANs for text generation.

BACKGROUND

Deep learning has shown great success in various domains such as natural language processing (NLP), autonomous driving, gaming, and unsupervised learning. Generative adversarial networks (GANs) have been developed to generate realistic-looking synthetic images. GANs correspond to a mini-max two-player game where two models (e.g., two artificial neural networks) are trained simultaneously: a generative model G that captures data distribution, and a discriminative model 1) that computes the probability that a sample comes from the training data rather than from the generator. GAN solutions can be useful when there is a scarcity of training samples.

GANs have achieved substantial success in the field of computer vision for generating realistic-looking images. However, applying a GAN to NLP applications can be technically challenging because of the discrete nature of natural languages (e.g., text in a language does not map to real numbers with an inherent mapping function). For example, one technical problem relates to backpropagation. In NLP applications, text is a sequence of discrete words, and the output of the generator would be a discrete representation of the sequence of words. The discrete nature of the representation of the sequence of words output by the generator makes the backpropagation procedure, which is used in training the GAN, difficult.

Accordingly, more efficient and robust techniques for training a GAN for NLP applications are desirable.

SUMMARY OF THE INVENTION

Technical advantages are generally achieved, by embodiments of this disclosure which describe methods and systems for training an autoencoder-based generative adversarial network (GAN) for text generation.

In accordance to embodiments for training an autoencoder-based generative adversarial network (GAN) executing on one or more processing units for text generation, the autoencoder-based GAN may train an encoder neural network of the autoencoder-based GAN. The encoder neural network may be configured to receive a one-hot representation of real text. The encoder neural network may further be configured to output a latent representation of the real text generated from the one-hot representation of the real text. The real text may comprise a sequence of words.

The autoencoder-based GAN may train a decoder neural network of the autoencoder-based GAN. The decoder neural network may be configured to receive the latent representation of the real text. The decoder neural network may further be configured to output a reconstructed softmax representation of the real text generated from the latent representation of the real text. The reconstructed softmax representation of the real text may comprise a soft-text that is a continuous representation of the real text.

The autoencoder-based GAN may train a GAN of the autoencoder-based GAN. The GAN may comprise a generator neural network and a discriminator neural network. The generator neural network may be configured to generate artificial text based on random noise data. The discriminator neural network may be configured to receive the soft-text from the decoder neural network. The discriminator neural network may further be configured to receive a softmax representation of the artificial text generated by the generator neural network. The discriminator neural network may additionally output a probability indicating whether the softmax representation of the artificial text received by the discriminator neural network is not from the generator neural network.

Apparatuses, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

A generative adversarial network (GAN) includes two separate deep artificial neural networks: a generator artificial neural network (generally referred to as a generator) and a discriminator artificial neural network (generally referred to as a discriminator). During training of the GAN, the generator receives random variables, z, with a probability distribution $P_z(z)$ and generates artificial samples (e.g., images or text) based on the received random variables, z. The discriminator receives real samples (e.g., real or observed images or text) and the artificial samples generated by the generator, and the discriminator predicts whether the artificial samples generated by the generator are real samples or artificial samples. The discriminator outputs a probability value of 1 when the discriminator predicts that the artificial samples are real samples, and a probability value of 0 when the discriminator predicts that the artificial samples are artificial samples. In the GAN training process, the generator and the discriminator are trained together to improve the performance of each other in an adversarial manner. A GAN implements a two-player mini-max game with the objective of deriving a Nash-equilibrium. The generator and the discriminator are trained together until the following adversarial loss function for the GAN is optimized:

$$\min_G \max_D \{E_{x \sim P_{data}(x)}[\log D(x)] + E_{z \sim p_z(z)}[\log(1 - D(G(z)))]\} \quad \text{Equation (1)}$$

Figure 1:
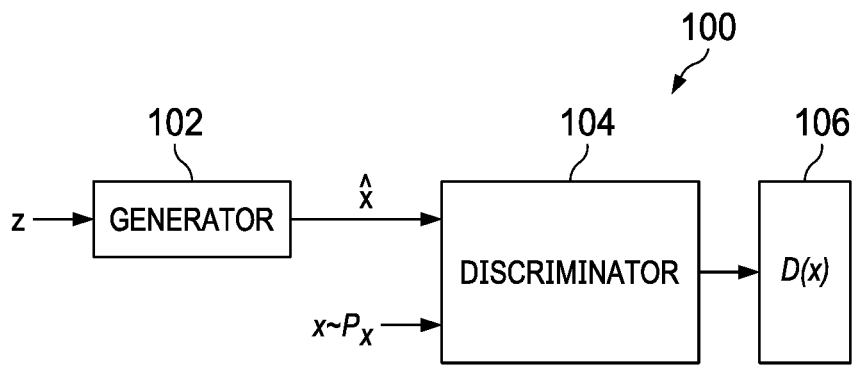
FIG. 1 is a block diagram of an example generative adversarial network (GAN)

FIG. 1 illustrates a block diagram of a generative adversarial network (GAN) 100. The GAN 100 may execute on one or more processing units. Examples of the processing units include, but are not limited to, graphics processing units (GPUs), tensor processing units (TPUs), application-specific integrated circuits (ASCIs), field-programmable gate arrays (FPGAs), artificial intelligence (AI) accelerators, or combinations thereof. The GAN 100 includes a generator 102, configured to receive random variables z and generate, from random variables z, artificial samples x̂ that are similar or close to the content of real samples x taken from a set of training samples comprising real samples once GAN is trained. The GAN 100 also includes a discriminator 104. The discriminator 104 is configured to receive both real samples x taken from the set of training samples and the artificial samples x̂ generated by the generator 102 and predict a probability D(x) 106 of whether the artificial sample x̂ is a real sample x (i.e., the artificial sample matches real sample x in the set of real samples).

Figure 2:
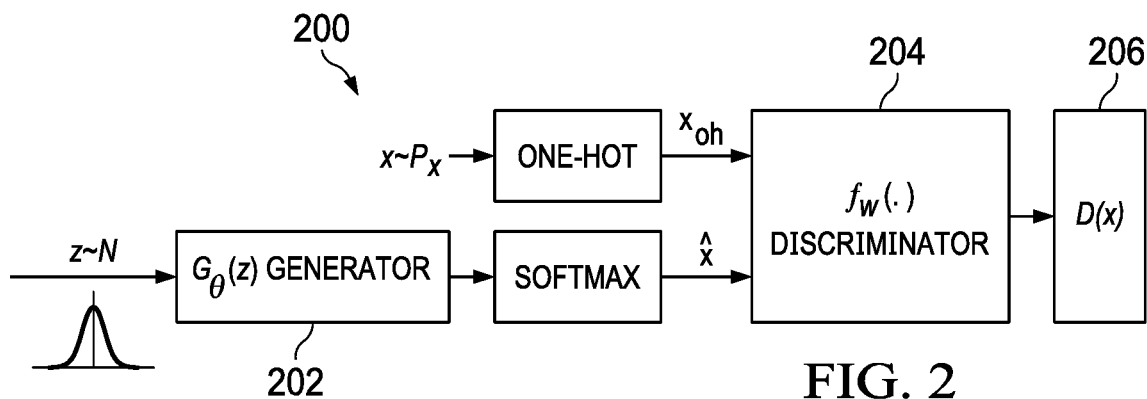
FIG. 2 illustrates a block diagram of a conventional GAN with a text-based generator.

GANs have achieved substantial success in the field of computer vision for generating realistic artificial images. Such success has motivated utilization of GANs in NLP applications as well. However, utilizing GANs in NLP applications has been challenging because of the discrete nature of natural languages (e.g., text in a language does not map to real numbers with an inherent mapping function). NLP applications utilize a natural language dictionary in all aspects of natural languages processing. The natural language dictionary includes K words in which each word is mapped to a K-dimensional representation. FIG. 2 illustrates a block diagram of a conventional GAN 200 with a text-based generator 202. The GAN 200 may execute on one or more processing units described above. The GAN 200 includes the text-based generator 202, configured to receive random variables z and generate artificial samples x̂ based on random variables z. In the example shown in FIG. 2, the generator 202 is configured to receive random variables z, and generate and output a K-dimensional vector of arbitrary real numbers. A softmax function is applied to the K-dimensional vector of arbitrary real numbers output by the generator 202 to generate a representation of an artificial sample x̂. The softmax function is a generalization of the logistic function that "squashes" a K-dimensional vector of arbitrary real numbers to a K-dimensional vector of real numbers, in which each entry of the vector is a real number in the range (0, 1), and all the real numbers add up to 1. The K-dimensional vector of real numbers, in which each entry of the vector is a real number in the range (0, 1), that is output by the softmax function can be used to represent a categorical distribution. That is, a probability distribution over K different possible real numbers. Thus, in the example shown in FIG. 2, the artificial sample x̂ output from the softmax function is the K-dimensional vector of real numbers in which each entry is a real number the range (0, 1), and is referred to as a softmax representation of the artificial text. The arg-max function is applied to the softmax representation of artificial text during inference (e.g., after training the GAN is completed) to obtain a representation that maps to words in the natural language dictionary.

The GAN 200 also includes a discriminator 204, which is configured to receive both an artificial sample x̂ (e.g., a softmax representation of the artificial text output by the generator 202) and a real sample x from a training set of training samples (e.g. real samples) and output a probability value that the artificial sample x̂ matches the real sample x in the training samples. The real sample x is a one-hot representation of real text from a set of real texts. A one-hot representation is a group of bits among which the allowable combinations of values are only those with a single high (1) bit and all the others low (0). For example, when text is words and the natural language dictionary comprises four words, x1, x2, x3, and x4, the word x1 may have a one-hot representation of 0001. The word x2 may have a one-hot representation of 0010. The word x3 may have a one-hot representation of 0100. The word x4 may have a one-hot representation of 1000. In FIG. 2, the box labelled with "ONE-HOT" encodes the real text into the one-hot representation.

For each artificial sample x̂ received by the discriminator 204 from the generator 202, the discriminator 204 predicts and outputs a probability D(x) 206 of whether the artificial sample x̂ received by the discriminator 204 is real (i.e., the softmax representation of the artificial text matches a one-hot representation of real text in a set of real texts) or fake (i.e., the softmax representation of the artificial text generated by the generator 202 does not match a one-hot representation of real text in a set of real texts).

Figure 3:
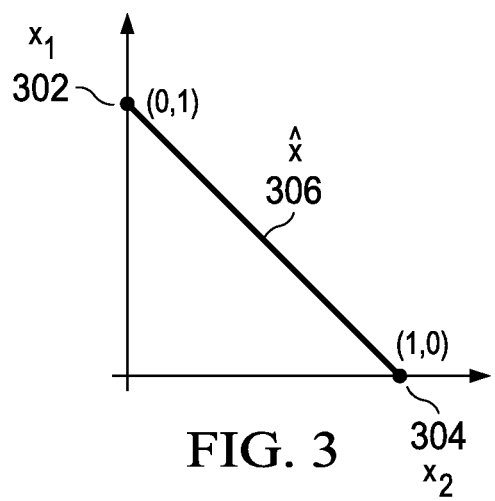
FIG. 3 shows the example locus of the input vectors to a discriminator of a conventional GAN for a two-word language.

In conventional GAN systems with text-based discriminators, such as GAN 200, the discriminator 204 is responsible for distinguishing between the one-hot representation of the real text and the softmax representation of the artificial text received from the generator 202. A technical disadvantage of this conventional technique is that the discriminator is able to easily tell apart the one-hot representation of the real text from the softmax representation of the artificial text. In other words, the generator 202 would have a hard time fooling the discriminator 204. This results in poor training of the GAN 200 and a vanishing gradient is highly likely to occur. FIG. 3 shows a graphical representation of the GAN 200 in Which the natural language dictionary includes two-words. The example shows a locus of the softmax representation of two words to the discriminator 204 of the conventional GAN 200 for a two-word language. The two-word language includes one-hot representations of two real words: the one-hot representation of real word $x_1$ (302) and the one-hot representation of real word $x_2$ (304). The discriminator 204 receives the one-hot representations of real word $x_1$ (302) and the real word $x_2$ (304). The discriminator 204 also receives a softmax representation of artificial text $\hat{x}$ (306) generated by the generator 202. FIG. 3 depicts the one-hot representations of these two real words as the two discrete points 302 and 304 in the Cartesian space. FIG. 3 also shows the span of the softmax representation of artificial words over the one-hot representations of the two words (i.e., the line segment 306 connecting the points $x_1$ 302 and $x_2$ 304). As FIG. 3 illustrates, the task of the discriminator 204 is to discriminate the points 302 and 304 from the line 306 connecting these two points, which would be an easy task for the discriminator 204.

Additionally, the discrete nature of the text of natural languages presents technical problems in training a GAN for text generation. For the GAN training, the representation of artificial text generated from the generator 202 needs to be differentiable for back-propagating the gradient from the discriminator. Therefore, the arg-max function cannot be applied.

The conventional systems, such as the GAN 200, use the discriminator to discriminate the softmax representation of artificial text from the one-hot representation of real text, in which there is a clear downside as the discriminator receives two different types of the inputs: a one-hot representation of the real text and a softmax representation of the artificial text. The consequence is that the discrimination task performed by the discriminator 204 becomes too easy. Particularly, to the discriminators in some conventional GAN systems, the one-hot representations of real text can be easily discriminated from the softmax representations of artificial text, which leads to vanishing gradient. Consequently, the artificial text generated by the generator 202 is less realistic.

To solve these technical problems, embodiments of this application use technical solutions that utilize autoencoders to learn continuous representations of the real text rather than the one-hot representations of real text. A continuous representation of real text is a K-dimensional vector of real numbers in which each entry of the K-dimensional vector is a probability (which is a continuous function that has a value between 0 and 1), and the probabilities of the K-dimensional vector sum to 1. Each entry of the K-dimensional vector maps to a word in a natural language dictionary of K words. An autoencoder is a type of artificial neural network used to learn efficient representations of text. The purpose of an autoencoder is to learn representations for a set of real text from a natural language dictionary, typically for the goal of dimensionality reduction. An autoencoder includes two networks: an encoder artificial neural network (hereinafter encoder neural network) and a decoder artificial neutral network (hereinafter decoder neural network). The encoder neural network of the autoencoder learns to map a one-hot representation of real text into a latent representation, and then the decoder neutral network of the autoencoder learns to decode the latent representation into a representation that closely matches the original one-hot representation of real text, referred to hereinafter as a reconstructed representation.

In example embodiments, the autoencoder-based GAN may learn a softmax representation of real text, which is a continuous representation of the real text. In contrast to the conventional GAN 200, the soft-text is input into the discriminator of a GAN. Inputting the soft-text into the discriminator as opposed to a one-hot representation of real text makes the discrimination task of the discriminator more difficult. Consequently, the soft-text approach provides a richer signal to the generator. At the time of training, the generator of the autoencoder-based GAN may try to learn continuous representations that are similar to the soft-text, which can later on be mapped to the real text by applying the arg-max function.

Figure 4:
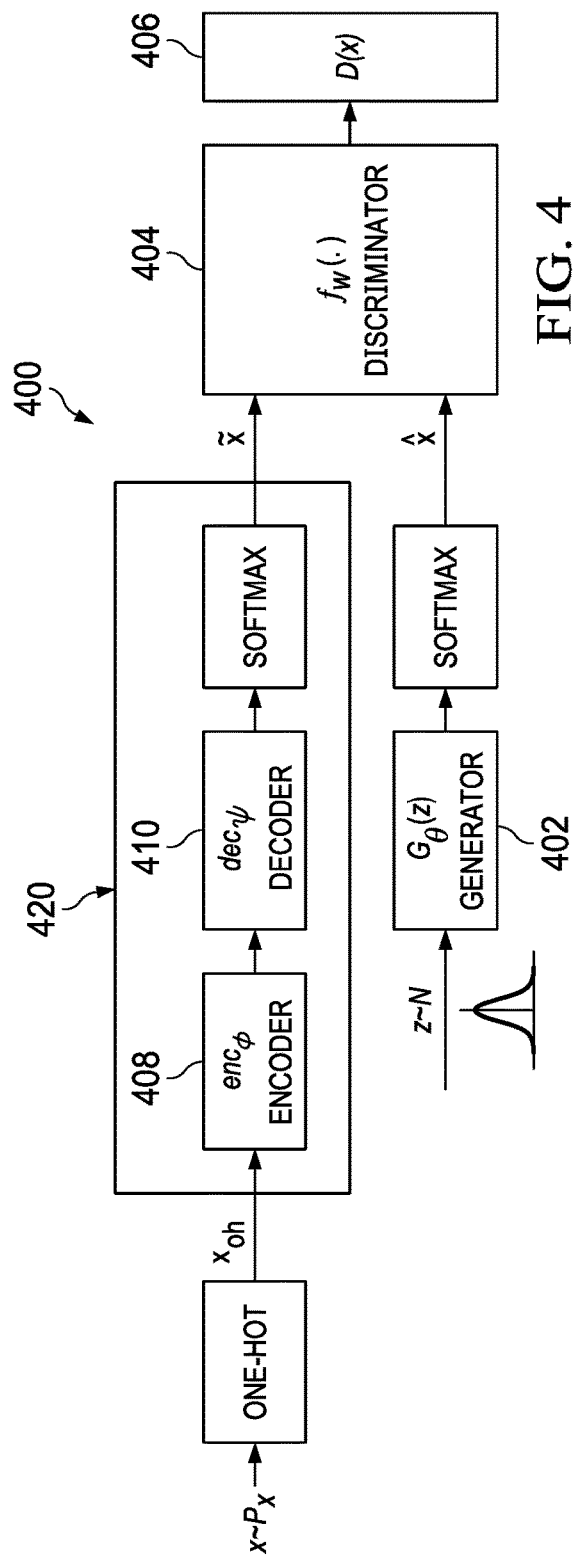
FIG. 4 illustrates a diagram of an autoencoder-based GAN for text generation, according to some embodiment.

FIG. 4 illustrates a diagram of an autoencoder-based GAN 400 for text generation, according to some embodiments. The GAN autoencoder-based 400 may execute on one or more processing units described above. The autoencoder-based GAN 400 includes a generator artificial neural network 402 (hereinafter generator 402) and a discriminator artificial neural network 404 (hereinafter discriminator 404). The autoencoder-based GAN 400 further includes an autoencoder 420, which comprises an encoder artificial neural network 408 (hereinafter encoder neural network 408) and a decoder artificial neural network 410 (hereinafter decoder neural network 410). In the autoencoder-based GAN 400, the discriminator neural network 404 receives the soft-text from the decoder neural network 410, rather than the one-hot representation of real text as shown in FIG. 3. Using soft-text output of the decoder neural network 410, instead of the one-hot representation of the real text, makes the discrimination task of the discriminator neural network 404 much harder, which in turn improves the quality of text generated by the generator neural network 402 during training of the GAN 400.

The encoder neural network 408 is configured to receive the one-hot representation of real text and output a latent representation of real text. In FIG. 4, the box labelled with "ONE-HOT" encodes the real text into the one-hot representation. The latent representation captures the semantic closeness of words and is a condensed representation of the one-hot representation of text.

The decoder neural network 410 is configured to receive the latent representation of real text and output a reconstructed representation of real text. The autoencoder 420 applies a softmax function to the reconstructed representation of real text output by the decoder 410 to generate a reconstructed softmax representation of the real text. The autoencoder 420 outputs the reconstructed softmax representation of the real text, which is referred to as soft-text. The reconstructed softmax representation of the real text (e.g., soft-text) is a continuous representation of the real text (e.g., a K-dimensional vector of real numbers in which each entry of the K-dimensional vector is a probability (which is a continuous function that has a value between 0 and 1), and the probabilities of the K-dimensional vector sum to 1).

The generator neural network 402 is configured to generate a softmax representation of artificial text based on random noise data. The discriminator neural network 404 is configured to receive soft-text from the decoder neural network 410 and also receive the softmax representation of artificial text from the generator neural network 402. The discriminator neural network 404 is configured to predict and output a probability D(x) 406 of whether the artificial text is real text (i.e., a probability that the softmax representation of artificial text matches the reconstructed softmax representation of the real text by the autoencoder 420) or fake text (i.e., a probability that the softmax representation of artificial text does not match the reconstructed softmax representation of the real text by the autoencoder 420).

To train the autoencoder-based GAN 400, three objective functions are utilized: (1) the reconstruction loss functions for the autoencoder 420 with the regularization term to penalize the output of the decoder neural network 410 if the representation output by decoder gets close to a one-hot representation, (2) the discriminator loss function with a gradient penalty, and (3) the generator 402 to be adversarially trained to the discriminator 404.

The autoencoder-based GAN 400 uses the reconstruction term for the autoencoder with the regularization term based on the following equation.

$$\min_{(\varphi,\psi)} L_{AE}(\varphi, \psi) =$$

$$\min_{(\varphi,\psi)} (\|x - \text{softmax}(dec_\psi(enc_\varphi(x)))\|^2 + \lambda_1 \text{Entropy}(\tilde{x}))$$

Equation (2)

Here, x is the one-hot representation of real tex. $\tilde{x}$ is the soft-text. $\lambda_1$ is a penalty coefficient. $\varphi$ denotes parameters of the encoder neural network 408, and $\psi$ denotes parameters of the decoder neural network 410.

To minimize the adversarial loss between the discriminator neural network 404 and the generator neural network 402, the autoencoder-based GAN 400 uses the discriminator loss function with a gradient penalty based on the following equation.

$$\min_{w \in W} L_{IWGAN\text{-}critic}(w) = \min_{w \in W} \Big( -E_{\tilde{x} \sim P_{\tilde{x}}}[f_w(\tilde{x})] +$$

$$E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2] \Big)$$

Equation (3)

Here, $\hat{x}$ is the softmax representation of artificial text. $\tilde{x}$ is the softmax representation of the decoder output (e.g., soft-text). $\bar{x}$ denotes random samples obtained by sampling uniformly along a line connecting pairs of softmax representations of artificial text and real text. $\lambda_2$ is a gradient penalty coefficient. w denotes parameters of the discriminator neural network 404. For the gradient penalty term, the autoencoder-based GAN 400 calculates the gradient norm for random samples $\hat{x} \sim P_{\hat{x}}$ and $\tilde{x} \sim P_{\tilde{x}}$. The random samples can be obtained by sampling uniformly along the line which connects pairs of softmax representations of artificial text and soft-text ($[\bar{x} \sim P_{\bar{x}}] \leftarrow \alpha[\tilde{x} \sim P_{\tilde{x}}] + (1-\alpha)[\hat{x} \sim P_{\hat{x}}]$).

To minimize the adversarial loss between the discriminator neural network 404 and the generator neural network 402, the autoencoder-based. GAN 400 further utilizes the following equation when the generator neural network 402 and the discriminator neural network 404 are adversarially trained.

$$\min_\theta L_{IWGAN\text{-}Gen}(\theta) = -\min_\theta E_{\hat{x} \sim P_{\hat{x}}}[f_w(\hat{x})]$$

Equation (4)

Here, $\hat{x}$ is the softmax representation of the artificial text. $\theta$ denotes parameters of the generator neural network 402.

In an example embodiment for training the neural networks in the autoencoder-based GAN 400, the autoencoder-based GAN 400 may define the encoder neural network 408 and the decoder neural network 410 of the autoencoder 420. These two neural networks of the autoencoder may be the long short term memory (LSTM) networks. The autoencoder-based GAN 400 may also define the generator neural network 402 and the discriminator neural network 404, which may be convolution neural networks (CNNs).

The autoencoder-based GAN 400 may derive the graph in TensorFlow. TensorFlow is an open-source software library for dataflow programming across a range of tasks. TensorFlow is a symbolic math library. TensorFlow can be used for machine learning applications such as neural networks.

The autoencoder-based GAN 400 may define the cost function for the autoencoder (e.g., $L_{AE}(\varphi, \psi)$ in the Equation (2) above), Which is a mean-squared difference of the one-hot representations of the real text and the reconstructed representation output from the decoder neural network 410. The autoencoder-based GAN 400 may also define the gradient penalty loss function for the discriminator neural network 404 (e.g., $L_{IWGAN\text{-}critic}(w)$ in the Equation (3) above). The autoencoder-based GAN 400 may further define the loss function for the generator neural network 402 (e.g., $L_{IWGAN\text{-}Gen}(\theta)$ in the Equation (4) above). In addition, the autoencoder-based GAN 400 may define Adam optimizers for the autoencoder, the generator neural network 402, and the discriminator neural network 404. Adam optimization is an optimization algorithm that can be used instead of the classical stochastic gradient descent procedure to update network parameters iteratively.

For training, the autoencoder-based GAN 400 first initializes all TensorFlow variables for the generator neural network 402, the discriminator neural network 404, the encoder neural network 408, and the decoder neural network 410. Then, for a number of training iterations, the autoencoder-based GAN 400 may train the autoencoder 420 (i.e., the encoder neural network 408 and the decoder neural network 410) for reconstruction, train the discriminator neural network 404 for k times, and train the generator neural network 402.

To train the autoencoder, the autoencoder-based GAN 400 may receive one-hot representations of real text $\{x^i\}_{i=1}^m \sim P_x$, compute latent representations $c^i = enc_\varphi(x^i)$, reconstruct a representation of the real text, and apply a softmax function to the reconstructed representation of the real text to generate a reconstructed softmax representation of the real text (e.g., soft-text) $\{\tilde{x}^i\}_{i=1}^m$. The autoencoder-based GAN 400 may then backpropagate the reconstruction loss $L_{AE}(\varphi, \psi)$ and update the parameters of the encoder neural network 408 and the decoder neural network 410.

To train the discriminator neural network 404 k times, the autoencoder-based GAN 400 may sample $\{x^i\}_{i=1}^m \sim P_x$ and sample $\{z^i\}_{i=1}^m \sim N(0,I)$. The autoencoder-based GAN 400 may also compute generated text $\{\hat{x}^i\}_{i=1}^m \sim G(z)$. Then, the autoencoder-based GAN 400 may backpropagate the discriminator loss $L_{IWGAN\text{-}critic}(w)$ and update the discriminator neural network 404.

To train the generator neural network 402, the autoencoder-based GAN 400 may receive random noise variables $\{z^i\}_{i=1}^m \sim N(0,I)$ and generate a representation of an artificial sample based on the random noise variables. The autoencoder-based GAN 400 may also compute a representation of artificial text, and apply a softmax function to the representation of the artificial text to generate a softmax representation of the artificial text $\{\hat{x}^i\}_{i=1}^m \sim G(z)$. Then, the autoencoder-based GAN 400 may backpropagate the generator loss $L_{IWGAN\text{-}Gen}(\theta)$ and update the parameters of generator neural network 402.

Figure 5:
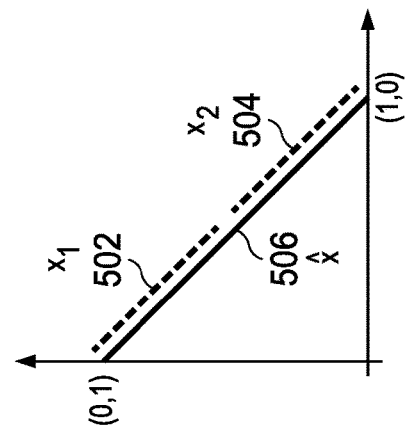
FIG. 5 shows the example locus of the input to a discriminator of the autoencoder-based GAN for a two-word language, according to some embodiments.

FIG. 5 shows graphical representation of the GAN 400 in which the natural language dictionary includes two-words. The example shows a locus of the inputs to a discriminator (e.g., the discriminator neural network 404) of the autoencoder-based GAN (e.g., the GAN 400) for a two-word language, according to some embodiments. The two-word language includes two real words: the real word $x_1$ and the real word $x_2$. The one-hot representation of real word $x_1$ and the one-hot representation of real word $x_2$ received by the discriminator neural network 404 are the reconstructed softmax representation output by the decoder neural network 410 as shown in 5. FIG. 5 also shows the span of the reconstructed softmax representation over the one-hot representations of the two real words $x_1$ and $x_2$ (i.e., the line segment 506).

As shown in FIG. 5, by using the reconstructed softmax representation output by the decoder neural network 410, the locus of the decoder neural network 410 would be two line segments 502 and 504, instead of two discrete points (e.g., points 302 and 304 in FIG. 3) in the case of using the one-hot representation of the two real words $x_1$ and $x_2$. These two line segments 502 and 504 lie on the locus 506, which would make the generator neural network 402 more successful in fooling the discriminator neural network 404 (i.e., the line segments 502 and 504 are hard to be discriminated from the line 506 than the discrete points 302 and 304 from the line 306). Consequently, the training of the GAN 400 is improved because the generator neural network 402, trained under autoencoder-based GAN 400 in embodiments of this disclosure, is able to generate more realistic artificial text than conventional GAN systems for text-generation.

Figure 6:
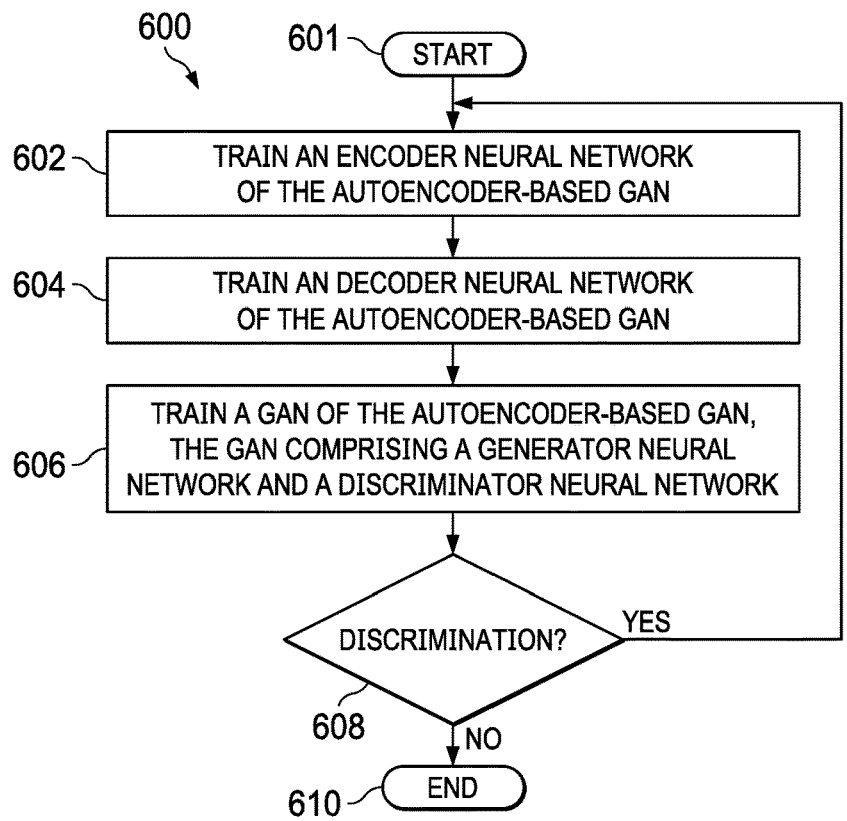
FIG. 6 illustrates a flowchart of a method for training an autoencoder-based GAN for text generation, according to some embodiments.

FIG. 6 illustrates a flowchart of a method 600 for training the autoencoder-based generative adversarial network (GAN) 400 for text generation, according to some embodiments. The method 600 may be carried out or performed by the autoencoder-based GAN 400 executing on one or more processing units. Examples of the processing units include, but are not limited to, graphics processing units (GPUs), tensor processing units (TPUs), application-specific integrated circuits (ASCIs), field-programmable gate arrays (FPGAs), artificial intelligence (AI) accelerators, or combinations thereof. The method 600 may also be carried out or performed by routines, subroutines, or modules of software executed by the one or more processing units. The method 600 may further be carried out or performed by a combination of hardware and software. Coding of the software for carrying out or performing the method 600 is well within the scope of a person of ordinary skill in the art having regard to the present disclosure. The method 600 may include additional or fewer operations than those shown and described and may be carried out or performed in a different order. Computer-readable code or instructions of the software executable by the one or more processing units may be stored on a non-transitory computer-readable medium, such as for example, the memory of a computing device.

The method 600 starts at the operation 601 and proceeds to the operation 602, where the autoencoder-based GAN may train an encoder neural network of the autoencoder-based GAN. The encoder neural network may be configured to receive a one-hot representation of a real text. The encoder neural network may also be configured to output a latent representation of the real text generated from the one-hot representation of the real text. The real text may comprise a sequence of words.

At the operation 604, the autoencoder-based GAN may train a decoder neural network of the autoencoder-based GAN. The decoder neural network may be configured to receive the latent representation of the real text. The decoder neural network may also be configured to output a reconstructed softmax representation of the real text. The reconstructed softmax representation of the real text is soft-text. The reconstructed softmax representation of the real text is a continuous representation of the real text.

The training of the encoder neural network and the training the decoder neural network may further comprise calculating a reconstruction loss based on a difference between the one-hot representation of the real text and the reconstructed softmax representation of the real text from the decoder neural network. The training of the encoder neural network and the training the decoder neural network may additionally comprise updating parameters of the encoder neural network and parameters of the decoder neural network based on the reconstruction loss. The reconstruction loss is regularized by using an entropy of the soft-text.

In one embodiment, the training the encoder neural network and the training the decoder neural network may further comprise minimizing a reconstruction loss $L_{AE}(\varphi, \psi)$ based on the equation below.

$$\min_{(\varphi,\psi)} L_{AE}(\varphi, \psi) = \min_{(\varphi,\psi)} (\|x - \text{softmax}(dec_\psi(enc_\varphi(x)))\|^2 + \lambda_1 \text{Entropy}(\tilde{x}))$$

In the above equation, x denotes the one-hot representation of the real text. $\tilde{x}$ denotes the soft-text. $\lambda_1$ denotes a penalty coefficient. $\varphi$ denotes parameters of the encoder neural network. $\psi$ denotes parameters of the decoder neural network.

At the operation 606, the autoencoder-based GAN may train a GAN of the autoencoder-based GAN. The GAN may comprise a generator neural network and a discriminator neural network. The generator neural network may be configured to generate artificial text based on random noise data. The discriminator neural network may be configured to receive the soft-text from the decoder neural network. The decoder neural network may also be configured to receive the softmax representation of artificial text generated by the generator neural network. The discriminator neural network may further be configured to output a probability indicating whether the softmax representation of the artificial text received by the discriminator neural network is not from the generator neural network (i.e., whether the softmax representation of the artificial text received by the discriminator network generated by the generator neural network 402 matches the soft text output by the autoencoder or not). The training of the GAN may further comprise calculating a discriminator loss based on the soft-text and the artificial text. The training of the GAN may additionally comprise updating parameters of the discriminator neural network based on the discriminator loss. In one embodiment, the training the GAN may further comprise minimizing a discriminator loss $L_{IWGAN\text{-}critic}(w)$ based on the equation below.

$$\min_{w \in W} L_{IWGAN\text{-}critic}(w) =$$

$$\min_{w \in W} \left( -E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2] \right)$$

In the above equation, $\tilde{x}$ is the soft-text. $\bar{x}$ denotes random data samples obtained by sampling uniformly along a line connecting pairs of synthetic and soft-text samples. $\hat{x}$ denotes the artificial text. $\lambda_2$ denotes a gradient penalty coefficient. w denotes parameters of the discriminator neural network.

The training of the GAN may further comprise calculating a generator loss that maximizes the probability of the discriminator network for the artificial text. The training of the GAN may additionally comprise updating parameters of the generator neural network based on the generator loss. In one embodiment, the training the GAN may further comprise minimizing a generator loss $L_{IWGAN\text{-}Gen}(\theta)$ based on the equation below.

$$\min_{\theta} L_{IWGAN\text{-}Gen}(\theta) = -\min_{\theta} E_{\hat{x} \sim P_{\hat{x}}}[f_w(\hat{x})]$$

In the above equation, $\hat{x}$ denotes the artificial data, and $\theta$ denotes parameters of the generator neural network.

After the operation 606, the autoencoder-based GAN may determine whether the discriminator neural network cannot discriminate the soft-text and the artificial text. If so, the autoencoder-based GAN may further perform the training of the autoencoder-based GAN by repeating the operation 602 (training the encoder neural network), the operation 604 (training the decoder neural network), and the operation 606 (training the GAN, which includes training the discriminator neural network and training the generator neural network). Otherwise, the method 600 ends at the operation 610.

In sum, embodiments of this disclosure address the main bottleneck of text generation using a GAN in dealing with discrete data. The text-based discriminator becomes more powerful than the discriminators in the traditional approaches. The generator also becomes more successful in fooling the discriminator than the generators in the traditional approaches. Consequently, after the adversarial training between the generator and the discriminator, the artificial text generated by the generator will be more realistic than the artificial text generated by the generators of the conventional systems.

The disclosed techniques in the embodiments of this disclosure can be applied to other technical areas. The disclosed techniques result in the better performance of text generation methods using GANs. More realistic and more understandable artificial text can be produced. The disclosed techniques can be applied directly to other applications such as bilingual machine translation and generating conversations.

The disclosed autoencoder-based GAN can be applied to text-to-text generation systems, such as machine translation systems, dialog models, and question answering systems, etc. For example, the disclosed techniques can be employed in a variety of natural language processing (NLP) related applications.

The disclosed techniques can be applied to summarization applications where textual summaries of the data set are generated. Examples of such applications include, but are not limited to, producing textual weather forecasts from weather data, summarizing financial and business data, summarizing electronic medical records, and describing graphs and data sets to blind people, etc.

Figure 7:
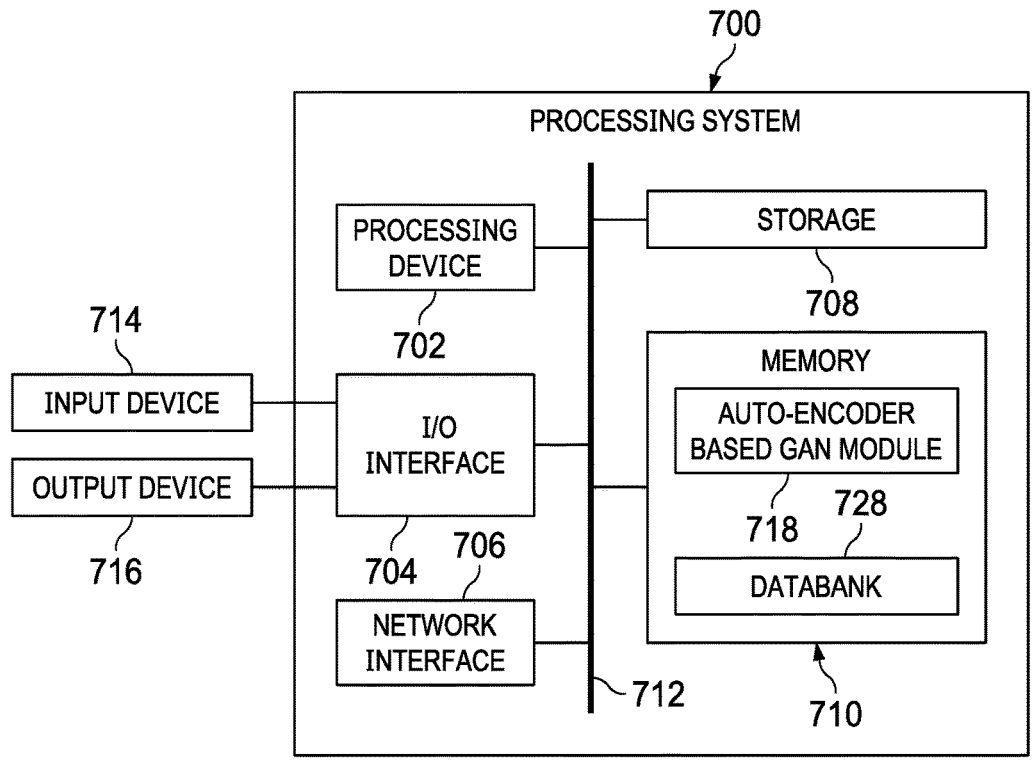
FIG. 7 is a block diagram of a processing system that can be used to implement an autoencoder-based GAN, according to example embodiments.

FIG. 7 is a block diagram of an example simplified processing system 700, which may be used to implement embodiments disclosed herein, and provides a higher level implementation example. The autoencoder-based GAN 400 of FIG. 4 and method 600 of FIG. 6 may be implemented using the example processing system 700, or variations of the processing system 700. The processing system 700 could be a server or a desktop terminal, for example, or any suitable processing system. Other processing systems suitable for implementing embodiments described in the present disclosure may be used, which may include components different from those discussed below. Although FIG. 7 shows a single instance of each component, there may be multiple instances of each component in the processing system 700.

The processing system 700 may include one or more processing devices 702, such as a processor, graphics processing unit (GPU), a microprocessor, an application-specific integrated circuit (ASIC), a field-programmable gate array (FPGA), a dedicated logic circuitry, a tensor processing units (TPU), an artificial intelligence (AI) accelerator, or combinations thereof. The processing system 700 may also include one or more input/output (110) interfaces 704, which may enable interfacing with one or more appropriate input devices 714 and/or output devices 716. The processing system 700 may include one or more network interfaces 706 for wired or wireless communication with a network (e.g., an intranet, the Internet, a P2P network, a WAN and/or a LAN) or other node. The network interfaces 706 may include wired links (e.g., Ethernet cable) and/or wireless links (e.g., one or more antennas) for intra-network and/or inter-network communications.

The processing system 700 may also include one or more storage units 708, which may include a mass storage unit such as a solid state drive, a hard disk drive, a magnetic disk drive and/or an optical disk drive. The processing system 700 may include one or more memories 710, which may include a volatile or non-volatile memory (e.g., a flash memory, a random access memory (RAM), and/or a read-only memory (ROM)). The non-transitory memory(ies) 710 may store instructions for execution by the processing device(s) 702, such as to carry out examples described in the present disclosure, for example to perform encoding or decoding. The memory(ies) 710 may include other software instructions, such as for implementing an operating system and other applications/functions. In some examples, one or more data sets and/or modules may be provided by an external memory (e.g., an external drive in wired or wireless communication with the processing system 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. There may be a bus 712 providing communication among components of the processing system 700, including the processing device(s) 702, I/O interface(s) 704, network interface(s) 706, storage unit(s) 708 and/or memory(ies) 710. The bus 712 may be any suitable bus architecture including, for example, a memory bus, a peripheral bus or a video bus.

In FIG. 7, the input device(s) 714 (e.g., a keyboard, a mouse, a microphone, a touchscreen, and/or a keypad) and output device(s) 716 (e.g., a display, a speaker and/or a printer) are shown as external to the processing system 700. In other examples, one or more of the input device(s) 714 and/or the output device(s) 716 may be included as a component of the processing system 700. In other examples, there may not be any input device(s) 714 and output device(s) 716, in which case the I/O interface(s) 704 may not be needed.

The memory(ies) 710 may include instructions for the auto-encoder based GAN module 718 that, when executed, cause the processing system 700 to perform a method such as the method 600 of FIG. 6. The memory(ies) 710 may further store training dataset (e.g., real text data samples) and generated text data samples in a databank 728.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for training an autoencoder-based generative adversarial network (GAN) executing on one or more processing units for text generation, the method comprising:

inputting, into an autoencoder of the autoencoder-based GAN, one-hot representations of a real text, the autoencoder including an encoder neural network configured to receive the one-hot representations of the real text and output a latent representation of the real text generated from the one-hot representations of the real text, the real text comprising a sequence of words from a K-word natural language dictionary, wherein the one-hot representations of the real text include a one-hot representation for each word in the sequence of words from the K-word natural language dictionary, the autoencoder further including a decoder neural network configured to receive the latent representation of the real text, and output a reconstructed softmax representation of the real text generated from the latent representation of the real text, the reconstructed softmax representation of the real text comprising a soft-text that is a continuous representation of the real text; and training a GAN of the autoencoder-based GAN, the GAN comprising a generator neural network configured for generating artificial text based on random noise data, and a discriminator neural network configured for receiving the soft-text from the decoder neural network and receiving a softmax representation of the artificial text generated by the generator neural network, and outputting a probability indicating whether the softmax representation of the artificial text received by the discriminator neural network is not from the generator neural network by iteratively repeating the generating the artificial text, the receiving the soft-text, the receiving the softmax representation of the artificial text, and the outputting the probability until a discriminator loss based on the soft-text and the softmax representation of the artificial text is minimized.

2. The method of claim 1, further comprising prior to the inputting the one-hot representations of the real text, training the encoder neural network and training the decoder neural network by:

inputting second one-hot representations of a second real text into the encoder neural network to output a second latent representation of the second real text generated from the second one-hot representations of the second real text, the second real text comprising a second sequence of words from the K-word natural language dictionary, wherein the second one-hot representations of the second real text include a one-hot representation for each word in the second sequence of words from the K-word natural language dictionary, the second latent representation of the second real text being input to the encoder neural network to output a second reconstructed softmax representation of the second real text generated from the second latent representation of the second real text, the second reconstructed softmax representation of the second real text comprising a second soft-text that is a second continuous representation of the second real text;

calculating a reconstruction loss based on a difference between the second one-hot representations of the second real text and the second reconstructed softmax representation of the second real text from the decoder neural network;

updating parameters of the encoder neural network and parameters of the decoder neural network based on the reconstruction loss; and iteratively repeating the inputting the second one-hot representations of the second real text, the inputting the second latent representation, the calculating the reconstruction loss, and the updating of the parameters of the encoder neural network and the parameters of the decoder neural network until the reconstruction loss is minimized.

3. The method of claim 2, wherein the reconstruction loss is regularized by using an entropy of a second soft-text in the second reconstructed softmax representation of the second real text.

4. The method of claim 2, wherein the training the encoder neural network and the training the decoder neural network further comprise:

minimizing the reconstruction loss of the autoencoder based on an equation:

$$\min_{(\varphi,\psi)} L_{AE}(\varphi, \psi) = \min_{(\varphi,\psi)}(\|x - \text{softmax}(dec_\psi(enc_\varphi(x)))\|^2 + \lambda_1 \text{Entrophy}(\tilde{x})),$$

wherein $L_{AE}(\varphi,\psi)$ denotes the reconstruction loss, wherein x denotes the one-hot representations of the real text, $\tilde{x}$ denotes the soft-text, $\lambda_1$ denotes a penalty coefficient, $enc_\varphi$ denotes the encoder neural network, $\varphi$ denotes parameters of the encoder neural network, $dec_\psi$ denotes the decoder neural network, and $\psi$ denotes parameters of the decoder neural network.

5. The method of claim 1, wherein the training the GAN further comprises:

calculating the discriminator loss based on the soft-text and the softmax representation of the artificial text; and updating parameters of the discriminator neural network based on the discriminator loss.

6. The method of claim 5, wherein the training the GAN further comprises:
calculating a generator loss that maximizes the probability output by the discriminator neural network; and
updating parameters of the generator neural network based on the generator loss.

7. The method of claim 6, wherein the training the GAN further comprises:
minimizing Flail the generator loss based on an equation:

$$\min_{\theta} L_{IWGAN\text{-}Gen}(\theta) = -\min_{\theta} E_{\hat{x} \sim P_{\hat{x}}}[f_w(\hat{x})],$$

wherein $L_{IWGAN\text{-}Gen}(\theta)$ denotes the generator loss, wherein $\hat{x}$ denotes the artificial text, $\theta$ denotes parameters of the generator neural network, $f_w$ denotes the discriminator neural network, and w denotes parameters of the discriminator neural network.

8. The method of claim 5, wherein the training the GAN further comprises:
minimizing the discriminator loss based on an equation:

$$\min_{w \in W} L_{IWGAN\text{-}critic}(w) =$$
$$\min_{w \in W} \left( -E_{\hat{x} \sim P_{\hat{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2] \right),$$

wherein $L_{IWGAN\text{-}critic}(w)$ denotes the discriminator loss, wherein $\hat{x}$ denotes the artificial text, $\tilde{x}$ denotes the soft-text, $\bar{x}$ denotes random data samples obtained by sampling uniformly along a line connecting pairs of artificial and soft-text, $\lambda_2$ denotes a gradient penalty coefficient, $f_w$ denotes the discriminator neural network, and w denotes parameters of the discriminator neural network.

9. The method of claim 1, wherein the continuous representation of the real text is a K-dimensional vector of real numbers in which each entry of the K-dimensional vector is a corresponding probability and maps to a corresponding word in the K-word natural language dictionary.

10. A device for training an autoencoder-based generative adversarial network (GAN), the device comprising:
one or more processing units;
a non-transitory computer readable storage medium storing programming for execution by the one or more processing units, the programming including instructions that, when executed by the one more processing units, cause the device to perform operations including:
inputting, into autoencoder of the autoencoder-based GAN, one-hot representations of a real text, the autoencoder including an encoder neural network configured to receive the one-hot representations of the real text and output a latent representation of the real text from the one-hot representations of the real text, the real text comprising a sequence of words from a K-word natural language dictionary, wherein the one-hot representations of the real text include a one-hot representation for each word in the sequence of words from the K-word natural language dictionary,
the autoencoder further including a decoder neural network, the decoder neural network configured to receive the latent representation of the real text, and output a reconstructed softmax representation of the real text generated from the latent representation of the real text, the reconstructed softmax representation of the real text comprising a soft-text that is a continuous representation of the real text; and
training a GAN of the autoencoder-based GAN, the GAN comprising a generator neural network configured for generating artificial text based on random noise data, and a discriminator neural network configured for receiving the soft-text from the decoder neural network and receiving a softmax representation of the artificial text generated by the generator neural network, and output a probability indicating whether the softmax representation of the artificial text received by the discriminator neural network is not from the generator neural network by iteratively repeating the generating the artificial text, the receiving the soft-text, the receiving the softmax representation of the artificial text, and the outputting the probability until a discriminator loss based on the soft-text and the softmax representation of the artificial text is minimized.

11. The device of claim 10, the operations further comprising prior to the inputting, training the encoder neural network and training the decoder neural network by:
inputting second one-hot representations of a second real text into the encoder neural network to output a second latent representation of the second real text generated from the second one-hot representations of the second real text, the second real text comprising a second sequence of words from the K-word natural language dictionary, wherein the second one-hot representations of the second real text include a one-hot representation for each word in the second sequence of words from the K-word natural language dictionary, the second latent representation of the second real text being input into the encoder neural network to output a second reconstructed softmax representation of the second real text generated from the second latent representation of the second real text, the second reconstructed softmax representation of the second real text comprising a second soft-text that is a second continuous representation of the second real text;
calculating a reconstruction loss based on a difference between the second one-hot representations of the second real text and the second reconstructed softmax representation of the second real text from the decoder neural network;
updating parameters of the encoder neural network and parameters of the decoder neural network based on the reconstruction loss; and
iteratively repeating the inputting the second one-hot representations of the second real text, the inputting the second latent representation, the calculating the reconstruction loss, and the updating of the parameters of the encoder neural network and the parameters of the decoder neural network until the reconstruction loss is minimized.

12. The device of claim 11, wherein the reconstruction loss is regularized by using an entropy of a second soft-text in the second reconstructed softmax representation of the second real text.

13. The device of claim 11, wherein the training the encoder neural network and the training the decoder neural network further comprise:

minimizing the reconstruction loss of the autoencoder based on an equation:

$$\min_{(\varphi,\psi)} L_{AE}(\varphi, \psi) = \min_{(\varphi,\psi)} (\|x - \text{softmax}(dec_\psi(enc_\varphi(x)))\|^2 + \lambda_1 \text{Entrophy}(\tilde{x})),$$

wherein $L_{AE}(\varphi,\psi)$ denotes the reconstruction loss, wherein x denotes the one-hot representations of the real text, $\tilde{x}$ denotes the soft-text, $\lambda_1$ denotes a penalty coefficient, $enc_\varphi$ denotes the encoder neural network, $\varphi$ denotes parameters of the encoder neural network, $dec_\psi$ denotes the decoder neural network, and $\psi$ denotes parameters of the decoder neural network.

14. The device of claim 10, wherein the training the GAN further comprises:

calculating the discriminator loss based on the soft-text and the softmax representation of the artificial text; and updating parameters of the discriminator neural network based on the discriminator loss.

15. The device of claim 14, wherein the training the GAN further comprises:

calculating a generator loss that maximizes the probability output by the discriminator neural network; and updating parameters of the generator neural network based on the generator loss.

16. The device of claim 15, wherein the training the GAN further comprises:

minimizing the generator loss based on an equation:

$$\min_\theta L_{IWGAN\text{-}Gen}(\theta) = -\min_\theta E_{\hat{x} \sim P_{\hat{x}}} [f_w(\hat{x})],$$

wherein $L_{IWGAN\text{-}Gen}(\theta)$ denotes the generator loss, wherein $\hat{x}$ denotes the artificial text, $\theta$ denotes parameters of the generator neural network, $f_w$ denotes the discriminator neural network, and w denotes parameters of the discriminator neural network.

17. The device of claim 14, wherein the training the GAN further comprises:

minimizing the discriminator loss based on an equation:

$$\min_{w \in W} L_{IWGAN\text{-}critic}(w) =$$
$$\min_{w \in W} \left( -E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2] \right),$$

wherein $L_{IWGAN\text{-}critic}(w)$ denotes the discriminator loss, wherein $\hat{x}$ denotes the artificial text, $\tilde{x}$ is the soft-text, $\bar{x}$ denotes random data samples obtained by sampling uniformly along a line connecting pairs of artificial and soft-text, $\lambda_2$ denotes a gradient penalty coefficient, $f_w$ denotes the discriminator neural network, and w denotes parameters of the discriminator neural network.

18. The device claim 10, wherein the continuous representation of the real text is a K-dimensional vector of real numbers in which each entry of the K-dimensional vector is a corresponding probability and maps to a corresponding word in the K-word natural language dictionary.

19. A non-transitory computer-readable storage medium having instructions stored thereon that, when executed by one or more processing units, cause the one or more processing units to perform operations for training an autoencoder-based generative adversarial network (GAN) for text generation, the operations comprising:

inputting, into autoencoder of the autoencoder-based GAN, one-hot representations of a real text, the autoencoder including an encoder neural network configured to receive the one-hot representations of the real text and output a latent representation of the real text from the one-hot representations of the real text, the real text comprising a sequence of words from a K-word natural language dictionary, wherein the one-hot representations of the real text include a one-hot representation for each word in the sequence of words from the K-word natural language dictionary, the autoencoder further including a decoder neural network, the decoder neural network configured to receive the latent representation of the real text, and output a reconstructed softmax representation of the real text from the latent representation of the real text, the reconstructed softmax representation of the real text comprising a soft-text that is a continuous representation of the real text; and training a GAN of the autoencoder-based GAN, the GAN comprising a generator neural network configured for generating artificial text based on random noise data, and a discriminator neural network configured for receiving the soft-text from the decoder neural network and receiving a softmax representation of the artificial text generated by the generator neural network, and output a probability indicating whether the softmax representation of the artificial text received by the discriminator neural network is not from the generator neural network by iteratively repeating the generating the artificial text, the receiving the soft-text, the receiving the softmax representation of the artificial text, and the outputting the probability until a discriminator loss based on the soft-text and the softmax representation of the artificial text is minimized.

20. The non-transitory computer-readable storage medium of claim 19, the operations further comprising prior to the inputting, training the encoder neural network and training the decoder neural network by:

inputting second one-hot representations of a second real text into the encoder neural network to output a second latent representation of the second real text generated from the second one-hot representations of the second real text, the second real text comprising a second sequence of words from the K-word natural language dictionary, wherein the second one-hot representations of the second real text include a one-hot representation for each word in the second sequence of words from the K-word natural language dictionary, the second latent representation of the second real text being input into the encoder neural network to output a second reconstructed softmax representation of the second real text generated from the second latent representation of the second real text, the second reconstructed softmax representation of the second real text comprising a second soft-text that is a second continuous representation of the second real text;

calculating a reconstruction loss based on a difference between the second one-hot representations of the second real text and the second reconstructed softmax representation of the second real text from the decoder neural network;

updating parameters of the encoder neural network and parameters of the decoder neural network based on the reconstruction loss; and iteratively repeating the inputting the second one-hot representations of the second real text, the inputting the second latent representation, the calculating the reconstruction loss, and the updating of the parameters of the encoder neural network and the parameters of the decoder neural network until the reconstruction loss is minimized.

21. The non-transitory computer-readable storage medium of claim 20, wherein the reconstruction loss is regularized by using an entropy of a second soft-text in the second reconstructed softmax representation of the second real text.

22. The non-transitory computer-readable storage medium of claim 20, wherein the training the encoder neural network and the training the decoder neural network further comprise:

minimizing the reconstruction loss of the autoencoder based on an equation:

$$\min_{(\varphi,\psi)} L_{AE}(\varphi, \psi) = \min_{(\varphi,\psi)} (\|x - \text{softmax}(dec_\psi(enc_\varphi(x)))\|^2 + \lambda_1 \text{Entrophy}(\tilde{x})),$$

wherein $L_{AE}(\varphi,\psi)$ denotes the reconstruction loss, wherein x denotes the one-hot representations of the real text, $\tilde{x}$ denotes the soft-text, $\lambda_1$ denotes a penalty coefficient, $enc_\varphi$ denotes the encoder neural network, $\varphi$ denotes parameters of the encoder neural network, $dec_\psi$ denotes the decoder neural network, and $\psi$ denotes parameters of the decoder neural network.

23. The non-transitory computer-readable storage medium of claim 19, wherein the training the GAN further comprises:

calculating the discriminator loss based on the soft-text and the softmax representation of the artificial text; and updating parameters of the discriminator neural network based on the discriminator loss.

24. The non-transitory computer-readable storage medium of claim 22, wherein the training the GAN further comprises:

calculating a generator loss that maximizes the probability output by the discriminator neural network; and updating parameters of the generator neural network based on the generator loss.

25. The non-transitory computer-readable storage medium of claim 24, wherein the training the GAN further comprises:

minimizing the generator loss based on an equation:

$$\min_\theta L_{IWGAN\text{-}Gen}(\theta) = -\min_\theta E_{\hat{x} \sim P_{\hat{x}}}[f_w(\hat{x})],$$

wherein $L_{IWGAN\text{-}Gen}(\theta)$ denotes the generator loss, wherein $\hat{x}$ denotes the artificial text, and $\theta$ denotes parameters of the generator neural network, $f_w$ denotes the discriminator neural network, and w denotes parameters of the discriminator neural network.

26. The non-transitory computer-readable storage medium of claim 23, wherein the training the GAN further comprises:

minimizing Flail the discriminator loss based on an equation:

$$\min_{w \in W} L_{IWGAN\text{-}critic}(w) = \min_{w \in W} \left( -E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2] \right),$$

wherein $L_{IWGAN\text{-}critic}(w)$ denotes the discriminator loss, wherein $\hat{x}$ denotes the artificial text, $\tilde{x}$ denotes the soft-text, $\bar{x}$ denotes random data samples obtained by sampling uniformly along a line connecting pairs of artificial and soft-text, $\lambda_2$ denotes a gradient penalty coefficient, $f_w$ denotes the discriminator neural network, and w denotes parameters of the discriminator neural network.

27. The non-transitory computer-readable storage medium of claim 19, wherein the continuous representation of the real text is a K-dimensional vector of real numbers in which each entry of the K-dimensional vector is a corresponding probability and maps to a corresponding word in the K-word natural language dictionary.

* * * * *

UNITED STATES PATENT AND TRADEMARK OFFICE
CERTIFICATE OF CORRECTION

PATENT NO. : 11,423,282 B2
APPLICATION NO. : 16/175280
DATED : August 23, 2022
INVENTOR(S) : Haidar Page 1 of 3

It is certified that error appears in the above-identified patent and that said Letters Patent is hereby corrected as shown below:

In the Claims

Claim 4, Column 14, Lines 51-53; delete " $\min_{(\varphi,\psi)} L_{AE}(\varphi, \psi) = \min_{(\varphi,\psi)} (\|x - \text{softmax}(dec_\psi(enc_\varphi(x)))\|^2 + \lambda_1 \text{Entrophy}(\tilde{x}))$, "

And insert -- $\min_{(\varphi,\psi)} L_{AE}(\varphi, \psi) = \min_{(\varphi,\psi)} (\|x - softmax(dec_\psi(enc_\varphi(x)))\|^2 + \lambda_1 Entropy(\tilde{x}))$, --

Claim 4, Column 14, Line 56; delete "x" and insert --$x$--.

Claim 7, Column 15, Line 9; delete "Flail".

Claim 7, Column 15, Lines 12-13; delete " $\min_\theta L_{IWGAN-Gen}(\theta) = -\min_\theta E_{\hat{x} \sim P_{\hat{x}}}[f_w(\hat{x})]$, "

And insert -- $\min_\theta L_{IWGAN-Gen}(\theta) = -\min_\theta E_{\hat{x} \sim P_{\hat{x}}}[f_w(\hat{x})]$ --.

Claim 7, Column 15, Line 18; delete "w" and insert --$w$--.

Claim 8, Column 15, Lines 25-27; delete
" $\min_{w \in W} L_{IWGAN-critic}(w) = \min_{w \in W}(-E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2])$, "

And insert
-- $min_{w \in W} L_{IWGAN-critic}(w) = min_{w \in W}(-E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2])$, --

Claim 8, Column 15, Line 35; delete "w" and insert --$w$--.

Signed and Sealed this
Seventh Day of November, 2023

Katherine Kelly Vidal
*Director of the United States Patent and Trademark Office*

CERTIFICATE OF CORRECTION (continued)
U.S. Pat. No. 11,423,282 B2

Claim 13, Column 17, Lines 8-9; delete
"$\min_{(\varphi,\psi)} L_{AE}(\varphi, \psi) = \min_{(\varphi,\psi)}(\|x - \text{softmax}(dec_\psi(enc_\varphi(x)))\|^2 + \lambda_1 \text{Entrophy}(\tilde{x}))$,"

And insert -- $\min_{(\varphi,\psi)} L_{AE}(\varphi,\psi) = \min_{(\varphi,\psi)}(\left\| x - softmax\left(dec_\psi\left(enc_\varphi(x)\right)\right)\right\|^2 + \lambda_1 Entropy(\tilde{x}))$, --.

Claim 13, Column 17, Line 12; delete "x" and insert --*x*--.

Claim 16, Column 17, Line 35-36; delete "$\min_\theta L_{IWGAN-Gen}(\theta) = -\min_\theta E_{\hat{x} \sim P_{\hat{x}}}[f_w(\hat{x})]$,"

And insert -- $\min_\theta L_{IWGAN-Gen}(\theta) = -\min_\theta E_{\hat{x} \sim P_{\hat{x}}}[f_w(\hat{x})]$, --.

Claim 16, Column 17, Line 42; delete "w" and insert --*w*--.

Claim 17, Column 17, Lines 50-52; delete

" $\min_{w \in W} L_{IWGAN-critic}(w) =$ $\min_{w \in W}\{-E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2]\}$,"

And insert

-- $min_{w \in W} L_{IWGAN-critic}(w) = min_{w \in W}(-E_{\tilde{x} \sim P_{\tilde{x}}}[f_w(\tilde{x})] + E_{\hat{x} \sim P_{\hat{x}}}[f_w(\hat{x})] + \lambda_2 E_{\bar{x} \sim P_{\bar{x}}}[(\|\nabla_{\bar{x}} f_w(\bar{x})\|_2 - 1)^2])$, --.

Claim 17, Column 17, Line 59; delete "w" and insert --*w*--.

Claim 22, Column 19, Lines 24-25; delete
"$\min_{(\varphi,\psi)} L_{AE}(\varphi, \psi) = \min_{(\varphi,\psi)}(\|x - \text{softmax}(dec_\psi(enc_\varphi(x)))\|^2 + \lambda_1 \text{Entrophy}(\tilde{x}))$,"

And insert

-- $\min_{(\varphi,\psi)} L_{AE}(\varphi,\psi) = \min_{(\varphi,\psi)}(\left\| x - softmax\left(dec_\psi\left(enc_\varphi(x)\right)\right)\right\|^2 + \lambda_1 Entropy(\tilde{x}))$, --.

Claim 25, Column 20, Lines 11-12; delete
"$\min_\theta L_{IWGAN-Gen}(\theta) = -\min_\theta E_{\hat{x} \sim P_{\hat{x}}}[f_w(\hat{x})]$,"

And insert -- $\min_\theta L_{IWGAN-Gen}(\theta) = -\min_\theta E_{\hat{x} \sim P_{\hat{x}}}[f_w(\hat{x})]$, --.

Claim 25, Column 20, Line 17; delete "w" and insert "*w*".

Claim 26, Column 20, Line 22; delete "Flail".

Claim 26, Column 20, Lines 25-27; delete

"$$\min_{w\in W} L_{IWGAN\text{-}critic}(w) = \min_{w\in W}\left(-E_{\tilde{x}\sim P_{\tilde{x}}}[f_w(\tilde{x})] + E_{\hat{x}\sim P_{\hat{x}}}[f_w(\hat{x})] + \lambda_2 E_{\bar{x}\sim P_{\bar{x}}}[(\|\nabla_{\bar{x}} f_w(\bar{x})\|_2 - 1)^2]\right),$$"

And insert

--$$min_{w\in W}\, L_{IWGAN-critic}(w) = min_{w\in W}(-E_{\tilde{x}\sim P_{\tilde{x}}}[f_w(\tilde{x})] + E_{\hat{x}\sim P_{\hat{x}}}[f_w(\hat{x})] + \lambda_2 E_{\bar{x}\sim P_{\bar{x}}}[(\|\nabla_{\bar{x}} f_w(\bar{x})\|_2 - 1)^2]),$$--.

Claim 26, Column 20, Line 35; delete "w" and insert --*w*--.